United States Patent [19]

Bold

[11] Patent Number: 4,847,022
[45] Date of Patent: Jul. 11, 1989

[54] METHOD FOR CONTINUOUSLY FORMING A UNIFORM LAYER OF MATERIAL THAT IS BEING DISPERSED

[75] Inventor: Jörg Bold, Kaiserslautern, Fed. Rep. of Germany

[73] Assignee: "Würtex" Maschinenbau Hofmann GmbH & Co., Fed. Rep. of Germany

[21] Appl. No.: 203,476

[22] Filed: Jun. 6, 1988

[30] Foreign Application Priority Data

Jun. 6, 1987 [DE] Fed. Rep. of Germany ....... 3719129

[51] Int. Cl.$^4$ .......................... D04H 1/00; B27N 3/14; B28B 1/00
[52] U.S. Cl. .................................. 264/40.7; 264/109; 264/333; 425/83.1
[58] Field of Search .................... 264/40.1, 40.7, 109, 264/121, 517, 333, 518; 425/80.1, 83.1

[56] References Cited

U.S. PATENT DOCUMENTS

| | | | |
|---|---|---|---|
| 2,518,744 | 8/1950 | Barnard | 264/109 |
| 2,822,024 | 2/1958 | Himmelheber et al. | 264/109 |
| 2,998,501 | 8/1961 | Sittell | 425/83.1 |
| 3,096,227 | 7/1963 | Van Elten | 264/109 |

FOREIGN PATENT DOCUMENTS 3404658 8/1985 Fed. Rep. of Germany .

Primary Examiner—Jan H. Silbaugh
Assistant Examiner—Mary Lynn Fertig
Attorney, Agent, or Firm—Becker & Becker, Inc.

[57] ABSTRACT

A method and apparatus for continuously forming a uniform layer of material that is being dispersed. This material, in the form of a stream of material, is deposited on an intermediate conveyer belt, as strips, transverse to the direction in which the material is fed to a dispersal mechanism. In the direction of travel of this intermediate conveyer belt, the strips abut one another in such a way that no gaps exist between them.

6 Claims, 2 Drawing Sheets

METHOD FOR CONTINUOUSLY FORMING A UNIFORM LAYER OF MATERIAL THAT IS BEING DISPERSED

BACKGROUND OF THE INVENTION

The present invention relates to a method and apparatus for continuously forming a uniform layer of material that is being dispersed.

German Offenlegungsschrift 34 04 658 dated Aug. 14, 1985 belonging to the assignee of the present invention, and applicant's copending U.S. patent application Ser. No. 791,225, filed Oct. 25, 1985 also belonging to the assignee of the present invention, disclose feeding the individual components of a material that is to be dispersed to a continuous mixer in a volumetrically and/or weight-metered manner. The mixed material is constantly withdrawn from the mixer as a material stream. Before this stream of material that is to be dispersed is delivered to a dispersal mechanism for uniform deposition as a dispersed material layer (mat) upon a continuously rotating molding belt for the manufacture of sheets, this material stream is discharged to an intermediate hopper for homogenization purposes. From this hopper, the material that is to be dispersed is withdrawn via a conveyer belt that is preferably regulated in conformity with the material stream, with one or more equalizing rollers being disposed on this conveyer belt. These equalizing rollers push or comb the overhanging material of the stream back counter to the direction of travel of the conveyer belt. The material stream, the cross-sectional area of which is regulated in this manner, is supplied to the dispersal mechanism.

The continuous formation of uniform layers of dispersed material pursuant to the previously described known methods has proven to be expedient for wood chipboards, mineral fiber sheets, and also for wood cement boards, gypsum chip boards, and gypsum fiber boards. However, where compressible material that is to be dispersed is involved, the homogenization of the material stream via an intermediate hopper is satisfactory only if, at a constant withdrawal cross section, the height of the material in the intermediate hopper is also to a large extent kept constant.

However, even under circumstances involving for the most part uniform withdrawal of material that is to be dispersed from an intermediate hopper, where the material has wider particle sizes, undesired classifying or separating effects occur as a result of the equalizing rollers that brush back the material that is to be dispersed.

In addition, the homogenization of a material stream via an intermediate hopper is extremely problematic for material that is to be dispersed and that contains rapidly hardening binding agents, such as moist, accelerated gypsum. However, it is precisely this rapid reaction of the gypsum that is advantageous for a continuous, rapid manufacturing process without long maturing times for the end products (sheets). In so doing, the easy formability of material mixtures containing gypsum is assured only if the binding process has not yet begun during the forming or compaction process. However, this extremely strict and time-critical criterium requires a precise and predeterminable processing time for the material from the time it is moistened until the compaction following the dispersal mechanism. However, with a material that is to be dispersed and that is temporarily stored in an intermediate hopper, and which in addition is homogenized via equalizing rollers that brush the material back, the retention time of at least a portion of the material is uncertain. It is not possible to preclude material particles from circulating in the intermediate hopper, as a result of being brushed back by the equalizing rollers, until they are bound.

It is therefore an object of the present invention to provide a method and apparatus for continuously forming a uniform layer of material that is being dispersed whereby all of the particles or components of the material are supplied for processing at the same speed without having a classifying effect occur.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
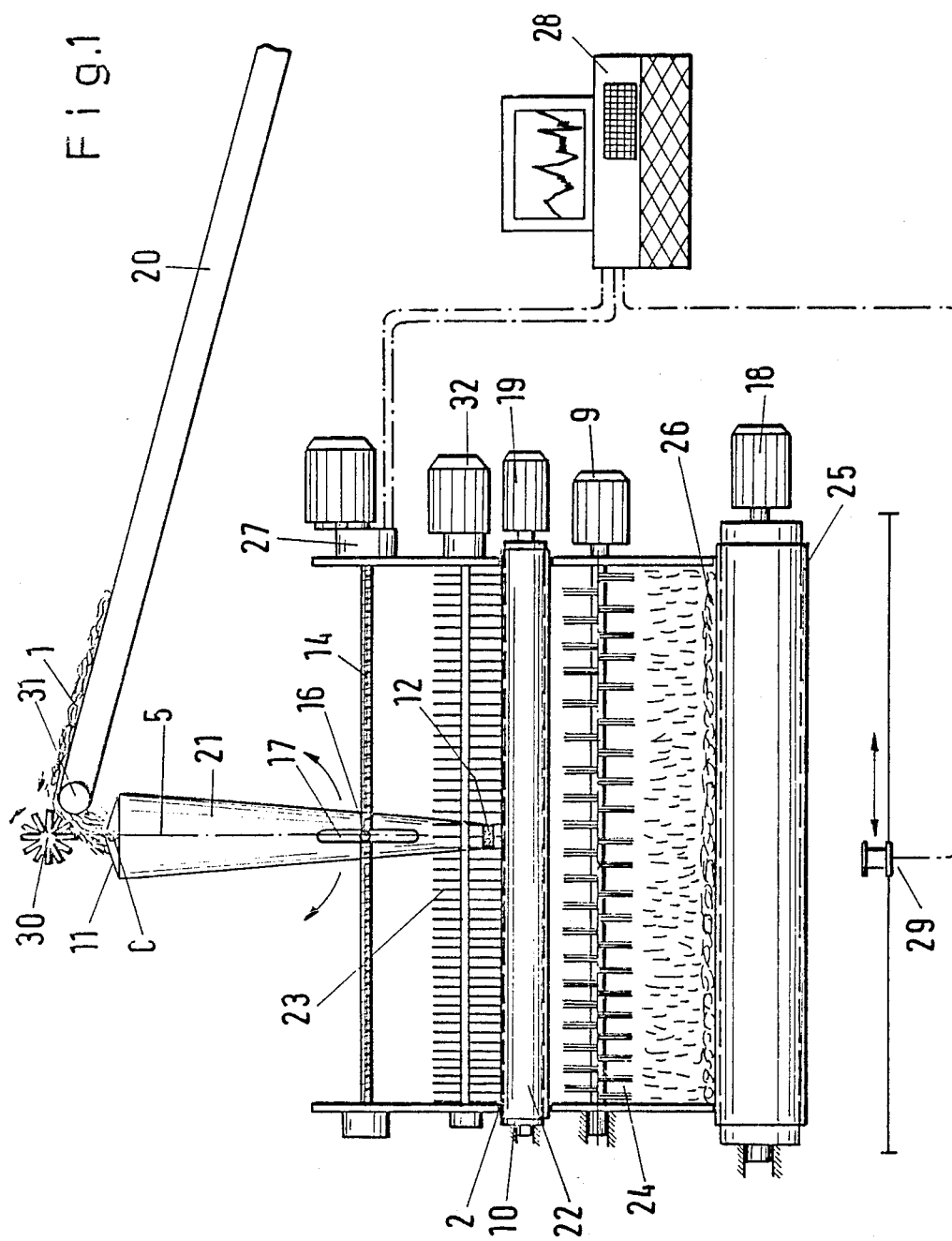
FIG. 1 is an end view of one exemplary embodiment of the inventive apparatus for carrying out the method of the present invention.

The method of the present invention includes the steps of: supplying a stream of material that is to be dispersed; converting this stream of material to an approximately uniform intermediate stream of material, including depositing an arriving stream of material in material strips transverse to the direction of travel of the intermediate stream, with the material strips being deposited one after the other in the direction of travel in such a way that they abut one another; supplying the intermediate stream of material to at least one dispersal mechanism; and then depositing the material onto a continuously operating molding belt to form the uniform layer.

By depositing the stream of material in strips to the dispersal mechanism transverse to the direction of feed, a homogenization is achieved that without further measures ensures an extensively uniform layer thickness of the mat of material that is dispersed upon the molding belt. Since no intermediate hopper exists, all of the components of the material that is to be dispersed are continuously processed at the same run-through times, so that with the invention method even extremely critical and rapidly processed. It is furthermore advantageous that with the inventive method, it is merely necessary to have a single, precise metering of the individual components of the mixture of the material that is to be dispersed. Thus, amplifications of metering deviations that occur due to multiple meterings, and also observed separations, can be reliably avoided.

The inventive method is particularly advantageous for mixtures that contain gypsum. However, the inventive method also provides advantages for the manufacture of wood chipboards, cement/chip mixtures for producing wood cement sheets, and also for perlite/mineral fibers and bitumen mixtures for the manufacture of lightweight insulating sheets, etc.

Pursuant to one advantageous specific embodiment of the inventive method, for the purpose of uniformity or homogenization, the strips of material are deposited, in the direction of travel, in an overlapping manner, preferably in a zig-zagged manner.

Pursuant to a further specific embodiment, which can also be independently provided for homogenizing a material stream, spreader rollers are provided that rotate in the direction of travel of the conveyer belt, with the rotational speed of these spreader rollers advantageously being several times the speed of the conveyer belt.

One advantageous apparatus of the present invention for carrying out the inventive method comprises: a first conveyer belt for receiving a stream of material that is to be dispersed; an intermediate conveyer belt for receiving the stream of material from the first conveyer belt and conveying it further as an essentially uniform stream; a chute that is disposed at the end of the first conveyer belt for receiving the stream of material therefrom and conveying the same to the intermediate conveyer belt, with the chute being pivotably mounted in such a way as to be movable back and forth transverse to the direction of travel of the intermediate conveyer belt; dispersal mechanism means for receiving the uniform stream of material from the intermediate conveyer belt; and a molding belt disposed below the dispersal mechanism means for receiving material therefrom and for forming the uniform layer of material.

By providing such a straightforward chute, which is expediently provided with devices for effecting centering and/or for affecting the rate at which the material that is to be dispersed falls through the chute, a sturdy, easily controllable measure is provided for the required deposition of the material stream in strips. The special shape of the chute assures an operation without disruption as well as a homogenization of the material stream.

Further specific features of the present invention will be described in detail subsequently.

DESCRIPTION OF PREFERRED EMBODIMENTS

Figure 2:
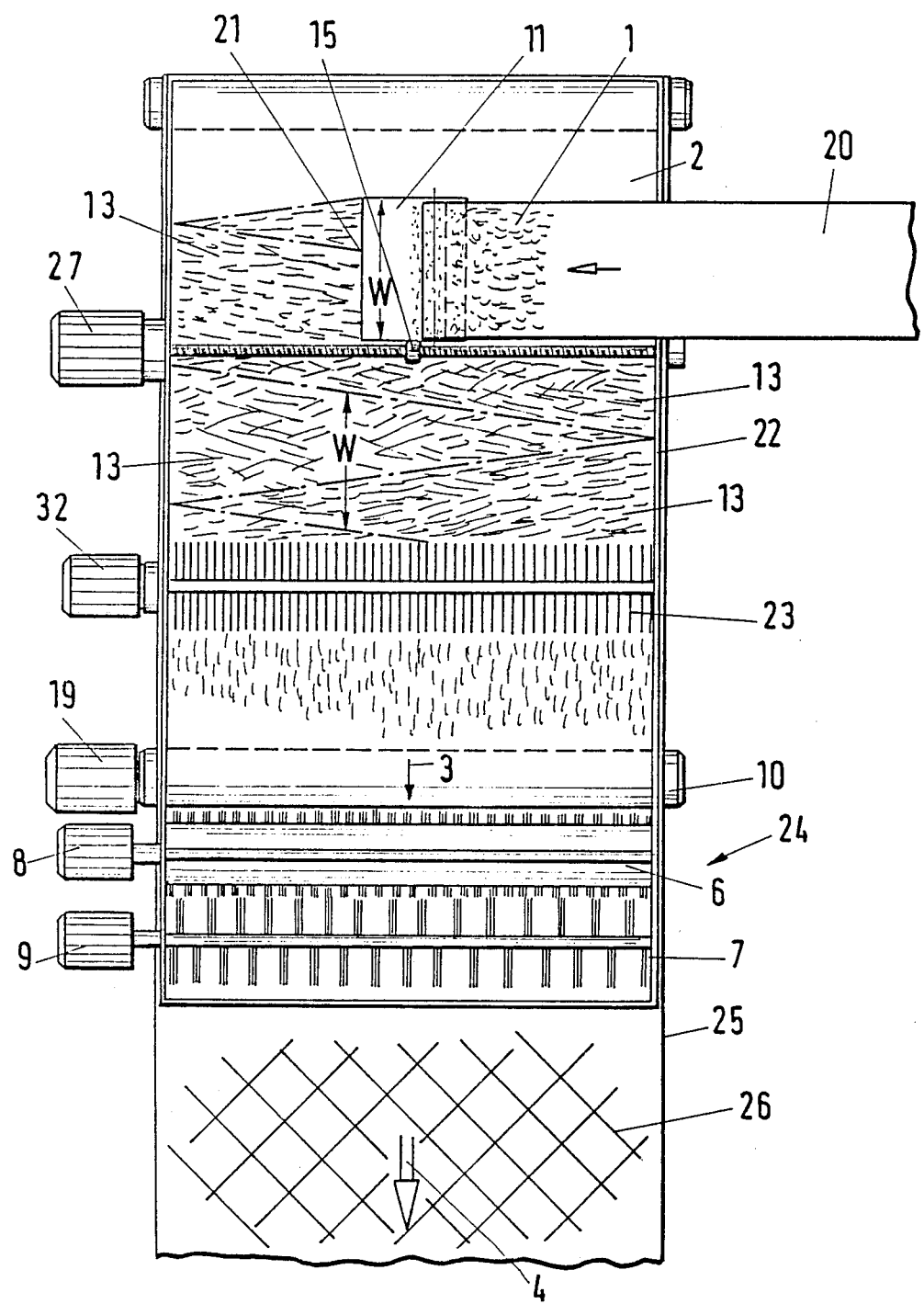
FIG. 2 is a partial plan view of the apparatus of FIG. 1.

Referring now to the drawings in detail, the inventive apparatus essentially comprises a first conveyer belt 20, the material stream 1 of which is fed to a dispersal mechanism 24 that is disposed above a molding belt 25. As can be seen in FIG. 2, the conveyer belt 20 is advantageously disposed at right angles to the molding belt 25; it could also be expedient to deviate from this right angle orientation. The width of the dispersal mechanism 24 is approximately equal to the width of the molding belt 25.

Disposed at the end of the conveyer belt 20, and below the guide or deflecting roller 31 thereof, is a gravity-type chute 21 that in the illustrated position is disposed perpendicular to the molding belt 25. The inlet or feed opening 11 of the chute 21 has an approximately rectangular cross-section shape, with the larger side length W being slightly greater than the width of the conveyer belt 20.

It can be expedient to convert the arriving material stream 1 into a narrower strip-like stream. This can be effected prior to placing the material upon the conveyor belt 20, or when the material is placed upon the intermediate conveyer belt 22, for which purpose the width of the discharge opening 12 of the chute 21, as measured transverse to the intermediate conveyer belt 22, is advantageously less than the width of the material stream 1 or the width of the first conveyer belt 20.

In the plan view of FIG. 2, the forward end of the conveyer belt 20, or its forward deflecting roller 31, is disposed approximately in the middle of the shorter side length of the rectangular feed opening 11.

The chute 21 is pivotably mounted above the upper run 2 of the endlessly rotating intermediate conveyer belt 22, with the pivot axis C extending parallel to the direction of travel 3 and 4 of the intermediate conveyer belt 22 and of the molding belt 25 respectively. The chute 21 tapers conically in a direction transverse to the direction of travel 3 of the intermediate conveyer belt 22, so that the chute opening 12, which is disposed just above the upper run 2 of the intermediate conveyer belt 22, also, just like the feed opening 11, has a rectangular cross-sectional shape, although transverse to the direction of travel 3 of the intermediate conveyer belt 22 the opening 12 is narrower than is the feed opening 11.

The height of the pivot axis C above the intermediate conveyer belt 22 is equal to at least 1.5 times the dispersal width of the intermediate conveyer belt.

In the illustrated embodiment, disposed below the pivot axis C is a drive mechanism 27 for moving the chute 21 back and forth transverse to the direction of travel 3 of the intermediate conveyer belt 22. This drive mechanism 27 is expediently a linear drive. In the illustrated embodiment, a threaded spindle 14 is disposed transverse to the intermediate conveyer belt 22. The speed and direction of rotation of this threaded spindle 14 can be varied by a motor as a function of control signals from a computer 28. The chute 21 is connected to the threaded spindle 14 via a nut 15 that runs thereon, with the nut 15, or a bolt 16 that is secured thereto, moving in a slot 17 that is disposed in the chute 21 parallel to the longitudinal axis 5 thereof.

The intermediate conveyer belt 22 is disposed between the dispersal mechanism 24 and the chute 21. The material that is to be dispersed is deposited upon the intermediate conveyer belt 22 via the chute 21, and is dumped or discharged into the dispersal mechanism 24 at the forward guide roller 10 of the intermediate conveyer belt 22. The latter is disposed above the molding belt 25, and has approximately the same width as the latter. The dispersal mechanism 24 is spaced above the molding belt 25 and below the intermediate conveyer belt 22.

The molding belt 25 is moved in the direction of travel 4 by a drive mechanism 18. The intermediate conveyer belt 22 is moved in the same direction of travel by the drive mechanism 19. Each of the two oppositely rotating dispersal rollers 6, 7 of the dispersal mechanism 24 is provided with its own drive mechanism 8, 9.

The individual components of the composite dispersal material mixture are continuously, especially as a function of weight, metered from a respective supply bin (not illustrated) and combined in a continuously operating mixer (also not illustrated). The mixed material continuously exits the non-illustrated mixer in a dosed manner as a material stream, and is deposited upon the conveyer belt 20.

By selecting a suitable discharge opening, and/or by other appropriate measures, the material stream 1 can advantageously be deposited upon the conveyer belt 20 with an approximately rectangular or trapezoidal cross-sectional shape.

The material stream 1 is discharged from the conveyer belt 20 into the chute 21. The material then falls through the chute and onto the intermediate conveyer belt 22. Devices are expediently built into the chute 21 for centering purposes and/or to influence the rate of fall of the dispersal material of the material stream 1.

As a consequence of the back and forth movement of the chute 21 transverse to the direction of travel 3 of the intermediate conveyer belt 22, the material stream 1 is deposited upon the intermediate conveyer belt in strips 13 of material. The successively deposited material strips 13 abut one another, without gaps, in the direction of travel 3 of the intermediate conveyer belt 22. For this purpose, the speed of the intermediate conveyer belt 22 and the swinging frequency of the chute 21 are appropriately coordinated with one another. The strips 13 can be abutted against one another without any gaps being formed if the intermediate conveyer belt 22, during a complete swinging stroke of the chute 21, covers a distance equal to a width W or an integral fraction of the width B of the material strip 13 deposited by the chute. The strips 13 are preferably deposited in such a way that they overlap one another. This overlapping expediently exhibits itself in a zig-zagged manner (see FIG. 2).

In order to obtain a uniform dispersed material layer 26 on the molding belt 25, i.e. in order to obtain sheets having a uniform thickness, the drive mechanism 27 of the chute 21 is controlled by the computer 28, to which is supplied, as a guide signal, the starting signal of a thickness-measuring device 29 (FIG. 1) that detects the thickness of the finished sheet at the end of the molding belt 25, or detects the thickness of the layer of dispersed material after the dispersal mechanism 24.

For geometric reasons, and due to certain edge effects due to acceleration and friction, even during an ideal linear pivoting movement of the chute, a uniform distribution is not always achieved over the entire width of the intermediate conveyer belt 22; on the whole, a symmetrical distribution with minimums and maximums results. The wave length of this distribution is a function of the overall geometry of the apparatus, but is always in the order of magnitude of decimeters.

To compensate for these fluctuations in the distribution, the angular velocity or frequency of the chute 21 is adjusted in a computer-controlled manner during each stroke. In other words, the transversely measured height profile of the deposited intermediate stream of material is represented in a frequency profile, and in so doing the previously mentioned edge condition, (relationship of intermediate conveyer belt speed and stroke frequency) is maintained.

The material that is to be dispersed and that is deposited in the aforementioned manner upon the intermediate conveyer belt 22 is now uniformly distributed in the middle over the width of the intermediate conveyer belt. However, small waves, the wave lengths of which are a function of the stroke frequency of the chute 21, can still occur in the direction of travel 3 of the intermediate conveyer belt 22.

These irregularities are compensated for to a large extent by at least one spreader roller 23 that throws or flings the material in the direction of travel 3 of the intermediate conveyer belt 22. Such a spreader roller 23 is advantageously embodied as a vaned, spiked, or brush-type roller. The drive mechanism 32 for the spreader roller 23 is provided in such a way that its rotational speed is considerably greater than the speed of the intermediate conveyer belt 22 in its direction of travel 3. Advantageously, the speed of the spreader roller 23 is several times greater than the speed of the intermediate conveyer belt 22. The distance of the outer generatrix of the spreader roller 23 from the surface of the intermediate conveyer belt 22 is at the level of the deepest valleys or troughs in the deposited intermediate material stream. The inventive spreader roller 23 is disposed approximately at the location where the known equalizing roller of the aforementioned state of the art is located. The distance of the spreader roller 23 to the end of the intermediate conveyer belt 22 is greater than its fling width in the direction of travel of the conveyer belt. It can be expedient to dispose several spreader rollers one after the other. In so doing, the distance between them must be adapted to the fling width. The arrangement of spreader rollers of this type for making a material stream uniform can also be independently advantageous (without a chute).

It can be expedient to dispose a spreader roller 30 at the end of the conveyer belt 20 in order to make the material stream 1 uniform; the direction of rotation of this spreader roller 30 corresponds to the direction of travel of the material stream 1. In this connection, the rotational speed of the spreader roller 30 is greater than the conveying speed of the material stream 1.

If in order to form a sheet several layers of material are dispersed one upon the other, the speed for supplying the material that is to be dispersed from a common mixer is regulated in such a way that the age of the mixture of each layer where they run together is the same. In this way, varying reaction times, and possible deformations of the end product, such as a sheet, are prevented.

The inventive method, and the apparatus provided for carrying out this method, are especially suitable for use with mixtures of material that are to be dispersed and that contain gypsum. However, the present invention is also advantageously usable for other materials, such as chips for wooden chipboard sheets, wafers or strands for OSW, cement/chip mixtures for wood cement sheets, perlite, mineral fibers, and bitumen mixtures for lightweight insulating sheets, etc.

The present invention is, of course, in no way restricted to the specific disclosure of the specification and drawings, but also encompasses any modifications within the scope of the appended claims.

What I claim is:

1. A method of continuously forming a uniform layer of material that is being dispersed, including the steps of:

supplying a stream of said material that is to be dispersed;

converting said material stream to an approximately uniform intermediate stream of material, including depositing an arriving stream of material in material strips transverse to the direction of travel of said intermediate stream of material, with said material strips being deposited one after the other, in said direction of travel, in such a way that they abut one another;

supplying said intermediate stream of material to at least one dispersal mechanism; and then depositing said material onto a continuously operating molding belt by said dispersal mechanism to form said uniform layer of dispersed material.

2. A method according to claim 1, in which said material strips are deposited in such a way that they overlap one another in said direction of travel of said intermediate stream of material.

3. A method according to claim 2, in which, when viewed in plan, said material strips are deposited in a zig-zagged manner relative to said direction of travel of said intermediate stream.

4. A method according to claim 1, which includes the step of providing spreader roller means that rotates in said direction of travel of said intermediate stream of material and evens-out the latter.

5. A method according to claim 1, which includes the step of converting said stream of material to a narrow material stream strip prior to said step of converting said material stream to said intermediate stream of material.

6. A method according to claim 1, which includes the steps of measuring the thickness of said uniform layer, and in conformity with such measurement, coordinating with one another a depositing speed for said material strips, and a travel speed for said intermediate stream of material.

* * * * *